Inventor
Ray H. Chase

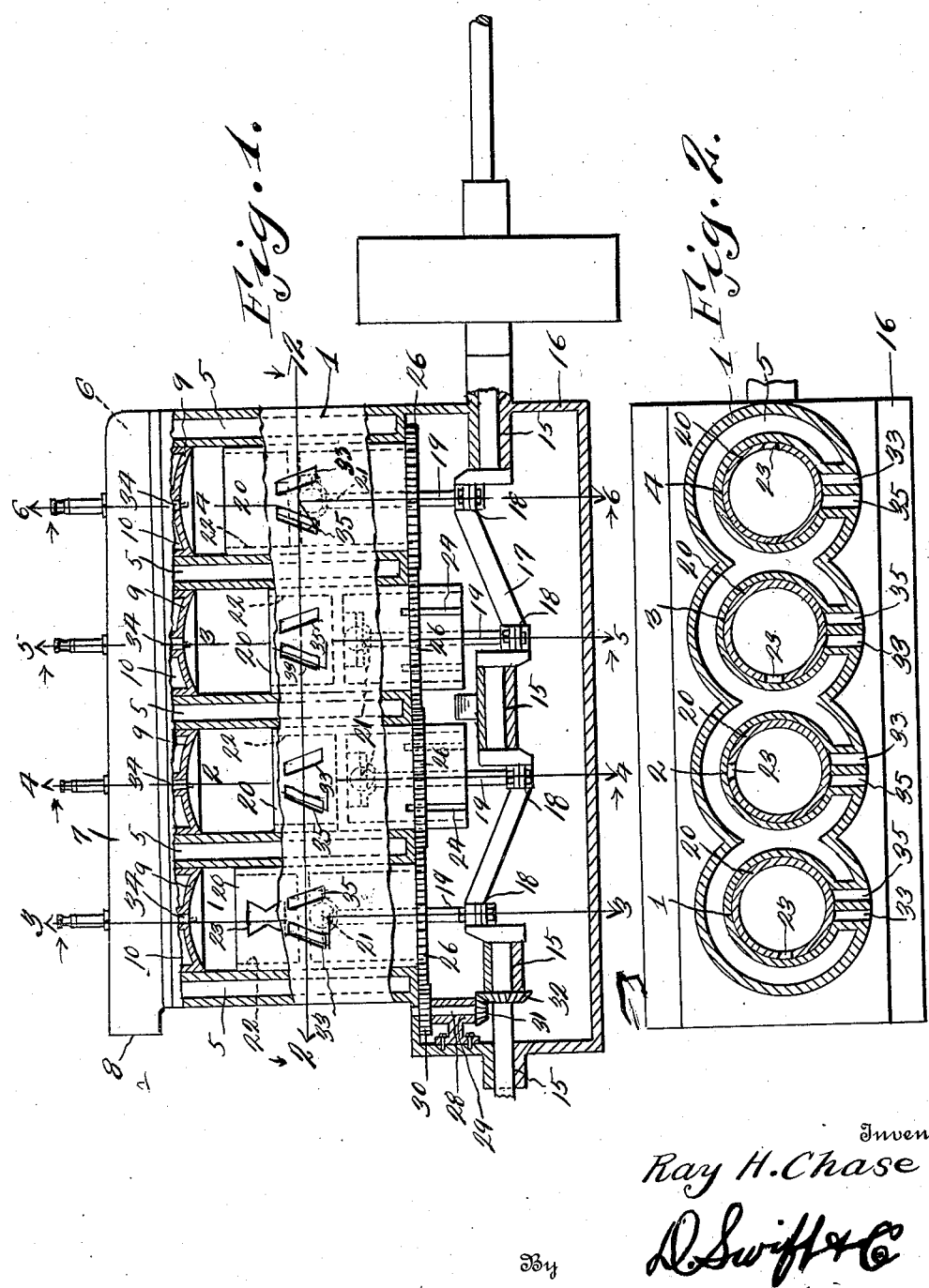

UNITED STATES PATENT OFFICE.

RAY H. CHASE, OF ALEXANDRIA, SOUTH DAKOTA, ASSIGNOR OF ONE-THIRD TO CHARLES I. CHASE, OF ALEXANDRIA, SOUTH DAKOTA.

INTERNAL-COMBUSTION ENGINE.

1,342,422.  Specification of Letters Patent.  Patented June 8, 1920.

Application filed May 19, 1919. Serial No. 298,212.

*To all whom it may concern:*

Be it known that I, RAY H. CHASE, a citizen of the United States, residing at Alexandria, in the county of Hanson, State of South Dakota, have invented a new and useful Internal-Combustion Engine; and I do hereby declare the following to be a full, clear, and exact description of the invention, such as will enable others skilled in the art to which it appertains to make and use the same.

The invention relates to internal combustion engines and has for its object to provide an engine of this character, wherein as the crank shaft revolves, horizontally arranged gears will be revolved, said gears being provided with means whereby the pistons will be revolved at the same time that they are being reciprocated by the connecting rods. Also to connect the upper ends of the connecting rods to the pistons by a ball and socket connection so that they may be easily revolved.

A further object is to provide cooling means for the cylinders around their sides and also provide the cylinders with plugs at their upper end, which plugs are hollow, thereby forming chambers for the reception of water so that the upper ends of the cylinders may be cooled as well as the vertical walls of the cylinders. Also to provide siphoning means whereby when the water is drained from the water jacket, the water in the chambers of the cylinder plugs will be siphoned out of the chambers of the plugs.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of an engine, parts being broken away to show the position of the cylinders and crank shaft.

Fig. 2 is a horizontal sectional view taken on line 2—2 of Fig. 1.

Figure 3:
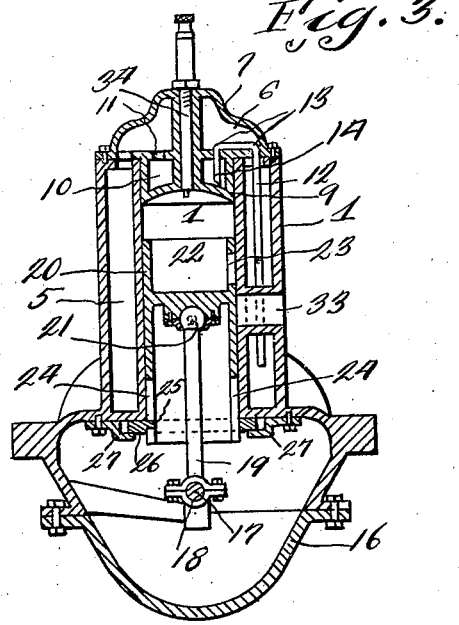
Fig 3 is a vertical sectional view taken on line 3—3 of Fig. 1.
Figure 4:
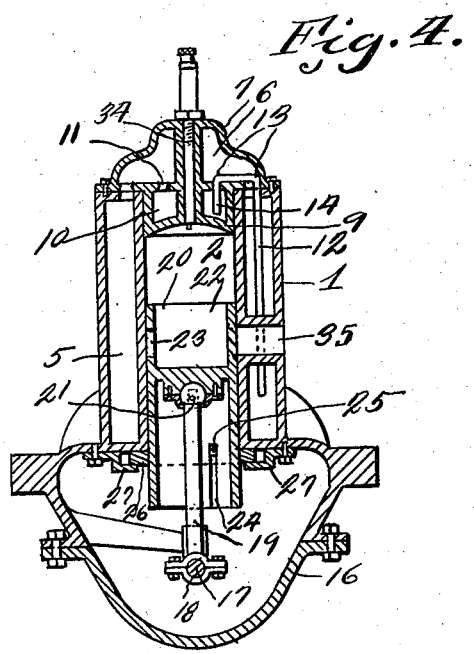
Fig. 4 is a vertical sectional view taken on line 4—4 of Fig. 1.
Figure 5:
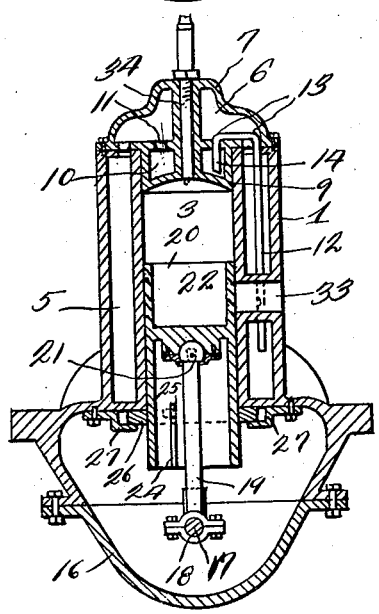
Fig. 5 is a vertical sectional view taken on line 5—5 of Fig. 1.
Figure 6:
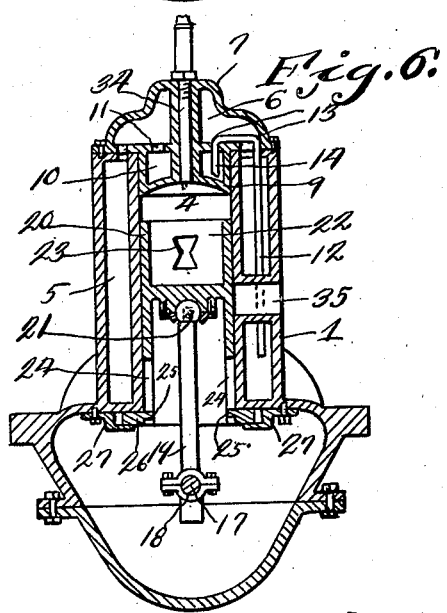
Fig. 6 is a vertical sectional view taken on line 6—6 of Fig. 1.

Referring to the drawings the numeral 1 designates a four cylinder internal combustion engine, said cylinders being designated by the numerals 1, 2, 3 and 4. The cylinders are surrounded by a water jacket 5 to which water is fed from the chamber 6 of the cylinder head casting 7, the end 8 of which may be connected by a pipe to the radiator of the vehicle. Extending downwardly from the cylinder head 7 are cylinder plugs 9 which are provided with water chambers 10 into which water passes from the chamber 6 through the apertures 11, thereby providing means whereby the plugs will be cooled as well as the body of the cylinders. Pipes 12 are disposed in the water jackets 5 and have their upper ends bent as at 13 so that downwardly extending portions 14 are formed, the portions 14 being disposed in the chambers 10, of the cylinder plugs 9. When the water is drained from the jacket 5, the pipes 12 will siphon the water from the chambers 10 of the plugs 9, thereby preventing the water from freezing in the plugs, which often causes the cracking of the same.

Rotatably mounted in bearings 15 of the crank casing 16 is a crank shaft 17 and connected to the crank shaft as at 18 are connecting rods 19, the upper ends of which are connected to the pistons 20 by ball and socket joints 21. The pistons 20 are adapted to reciprocate in the cylinders and at the same time rotate, said rotation being so timed with the reciprocation that the usual cycles of operation will take place in connection with intake and exhaust ports. Each piston 20 is provided at its upper end with a chamber 22, the wall of which is provided with a port 23, which port serves the double function of an intake and exhaust port. The pistons at their lower ends are provided with vertical slots 24 for the reception of lugs 25, carried by rotatable gears 26 which surround the lower ends of the pistons. These gears 26 are in mesh with each other and are supported in horizontal relation to each other and in mesh by means of brackets 27, which form bearings for the gears. A vertical shaft 28 is mounted in a bearing 29 at one end of the crank casing, the upper end thereof being provided with a gear which meshes with the piston gear 26 of the end cylinder. Secured to the lower end of the vertical shaft 29 is a bevel gear which meshes with a bevel gear 32 carried by the crank shaft 17. Gears 30, 31 and 32 are of such a size, that when the crank shaft 17 makes a half revolution, the gears in which the pistons reciprocate will cause the pistons to make a quarter revolution, thereby taking each cylinder through the usual four cycles of operation. For instance in the case of the cylinder number 1, as the piston 20, starts downwardly, the port 23, will pass the intake port 33, thereby sucking or allowing the entrance of the gases into the combustion chamber, during this downward movement the port 23 will have moved ninety degrees and the crank shaft one hundred eighty degrees, then the piston 20 starts upwardly on a compression stroke thereby compressing the charge, by this time the piston will have revolved one hundred eighty degrees and the crank shaft has made a completed revolution. The charge having been compressed the same is fired by the spark plugs 34 and the piston moves downwardly on the power stroke, however the piston will during this downward movement move ninety degrees in rotation making a total rotation of two hundred and seventy degrees and the crank shaft making a total rotation of one and a half rotations. At the end of the power stroke the piston starts upwardly, during which upward movement the same is rotated ninety degrees which completes a cycle of operation, however during this upward movement the port 23 passes the exhaust port 35, thereby allowing the exhaust of the products of combustion. The operation of the other cylinders is the same, with the exception that the pistons in the cylinders 2 and 4 revolve in the opposite direction to the pistons in the cylinders 1 and 3.

From the above it will be seen that an internal combustion engine is provided, wherein the use of valves is eliminated and one wherein the timing will be positive at all times. It will also be seen that by the use of the chambered plugs, which extend into the upper ends of the cylinders, that the cylinders will be thoroughly and completely cooled at the tops of the explosion chambers. It is to be understood that various types of ball and socket connections may be used to connect the connecting rods to the pistons, or if so desired roller bearings may be used.

The invention having been set forth, what is claimed as new and useful is:—

An internal combustion engine comprising a casing having a cylinder therein, a crank shaft rotatably mounted in the casing, said crank shaft being provided with a connecting rod, a piston universally connected to the upper end of the connecting rod and disposed in the cylinder, the upper end of the piston being provided with a chamber, a combined intake and exhaust port in the wall of the piston and in communication with same chamber, said combined intake and exhaust port being restricted centrally, elongated intake and exhaust ports in the wall of the cylinder, said intake and exhaust ports being angularly arranged and so positioned that as the piston rotates and simultaneously reciprocates the exhaust and intake ports will be maintained in registration with the combined intake and exhaust port for a maximum length of time during a reciprocating and simultaneous rotation of the piston.

In testimony whereof I have signed my name to this specification in the presence of two subscribing witnesses.

RAY H. CHASE.

Witnesses:
M. J. MANEY,
W. W. BOYD.